United States Patent

Binger

[11] 3,966,005
[45] June 29, 1976

[54] COMPOUND STEERING SYSTEM FOR ENDLESS-TRACK VEHICLES

[75] Inventor: Bernhard Binger, Ravensburg, Germany

[73] Assignee: Zahnradfabrik Friedrichshafen AG, Friedrichshafen, Germany

[22] Filed: Jan. 15, 1975

[21] Appl. No.: 541,108

[52] U.S. Cl. .............................. 180/6.44; 74/720.5
[51] Int. Cl.² .......................................... B62D 11/16
[58] Field of Search ............. 180/6.44, 6.7; 74/687, 74/688, 661, 720.5

[56] References Cited
UNITED STATES PATENTS

| | | | |
|---|---|---|---|
| 3,373,636 | 3/1968 | Livezey et al. | 180/6.7 X |
| 3,534,635 | 10/1970 | Polak | 74/720.5 |

Primary Examiner—M. H. Wood, Jr.
Assistant Examiner—John A. Pekar
Attorney, Agent, or Firm—Karl F. Ross; Herbert Dubno

[57] ABSTRACT

The driven sprockets of a pair of endless tracks on opposite sides of a vehicle are coupled with an engine by way of a hydraulic torque converter and a reversible transmission, the latter including two differential-gear sets with secondary inputs which can be rotated in mutually opposite directions by a steering unit comprising a mechanical and a hydraulic power train linked by two cascaded planetary-gear sets. The hydraulic power train receives torque directly from the engine whereas the mechanical power train is driven by the output of the torque converter to provide intensified steering action when, on downhill driving, the turbine of the converter outruns its impeller. The mechanical power train includes a pair of reversing clutches nested within a pair of similar clutches of the reversible transmission.

8 Claims, 1 Drawing Figure

U.S. Patent June 29, 1976 3,966,005
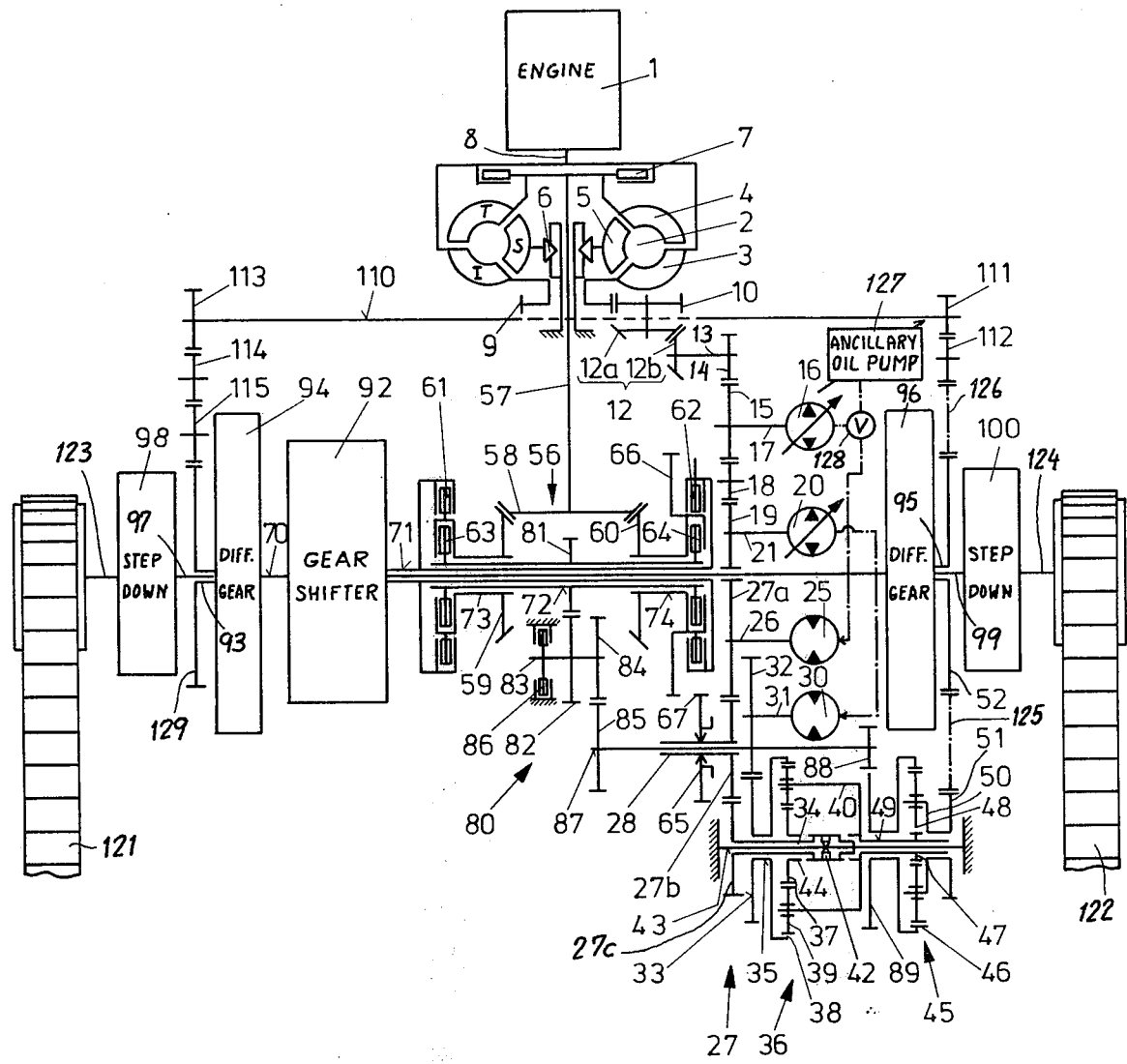

COMPOUND STEERING SYSTEM FOR ENDLESS-TRACK VEHICLES

FIELD OF THE INVENTION

My present invention relates to a vehicular steering system of the type wherein veering in one or the other direction is effected by applying opposite torques to a pair of driven traction elements, such as endless tracks, on opposite sides of the vehicle body.

BACKGROUND OF THE INVENTION

It has already been proposed (see commonly owned German Printed Specification No. 1,929,380) to power a pair of driven shafts, connected with respective endless-track sprockets, from an engine via a transmission including a pair of differential-gear sets in respective branches thereof, these differential-gear sets having codirectionally rotatable driving inputs and oppositely rotatable steering inputs. Differential rotation can be imparted to these steering inputs from the engine via a continuously adjustable hydraulic power train and/or a supplemental mechanical power train through the intermediary of a pair of cascaded planetary-gear sets, the hydraulic power train comprising a pair of hydrostatic motors fluidically linked with an engine-driven pump or pair of pumps and drivingly coupled with respective inputs of the first-stage planetary-gear set. When driving along a road, the operator of such a vehicle uses the hydraulic power train for precise maneuvering; in the field, however, the mechanical power train enables sharper turns to be carried out.

If a hydraulic torque converter is included in the transmission between the engine and the driving inputs of the differential-gear sets associated with the traction elements, problems may arise in situations of negative load—as during downhill driving—when the turbine on the output side of the converter outruns its impeller on the input side. As the engine slows down, the torque transmitted by the mechanical power train and added to that of the hydraulic train may not suffice to steer the vehicle through sharp curves along a descending road. While the steering torque could be intensified by accelerating the engine, the driver will instinctively act in the opposite way by further throttling the fuel supply.

OBJECTS OF THE INVENTION

The general object of my present invention, therefore, is to provide means in such a compound steering system for obviating the aforestated drawback.

A more particular object is to provide a compact construction for such a compound steering system.

It is also an object of my invention to provide means in such a system for enabling the vehicle to be driven and steered from an ancillary power source upon failure of the engine, e.g. for want of fuel.

SUMMARY OF THE INVENTION

In accordance with my present invention, the continuously adjustable hydraulic power train is coupled with the input side of the torque converter, and thus directly with the engine, whereas the mechanical power train is coupled with its output side. Thus, under the above-discussed condition of the turbine outrunning the impeller, the rotary motion differentially supplied to the two traction elements will be obtained from the faster-running turbine rather than from the slower-running impeller. The driver thus will be able to negotiate sharp turns while going downhill.

Under special circumstances, e.g. when the turbine slips under load to such an extent that insufficient torque is supplied by the mechanical power train, the converter can be short-circuited by a suitable bypass clutch as the traction drive is shifted into low gear.

With two hydrostatic motors included in the hydraulic power train as disclosed in the above-identified German printed specification, at least one of these motors may be disconnectable from the respective input of the first planetary-gear set and connectable instead, with the aid of manually operable changeover means, to the main shaft for establishing a driving connection from this motor to the traction elements and to the mechanical power train of the steering unit. Upon such changeover, this hydrostatic motor may be used for driving and steering the vehicle at slow speed even if the engine fails, provided that an ancillary hydraulic pump driven by an external power source is available to operate that motor.

BRIEF DESCRIPTION OF THE DRAWING

The above and other features of my invention will now be described in detail with reference to the accompanying drawing the sole FIGURE of which schematically shows a compound steering system representing a preferred embodiment.

SPECIFIC DESCRIPTION

The vehicular steering system shown in the drawing serves for the control of a pair of traction elements 121, 122, here specifically endless tracks, provided with shafts 123, 124 which are driven from an engine 1 through the intermediary of a hydraulic torque converter 2 including the usual impeller 3, turbine 4 and stator 5; the stator is shown provided with a one-way coupling 6. A manual or hydraulic clutch 7 can be actuated to bypass the torque converter 2 by directly coupling the engine shaft 8, secured to impeller 3, with turbine 4 and thus with a main shaft 57 secured to the turbine rotor.

A transmission 56 for reversibly driving the shafts 123 and 124 comprises a bevel gear 58 keyed to shaft 57 and meshing with two other bevel gears 59 and 60 whose coaxial tubular shafts 73 and 74 form part of a nest of shafts 70 – 74. Tubular shaft 71 can be linked with shaft 73 or 74 for entrainment in one or the other direction by actuation of one of two clutches 61 and 62. Tubular shaft 72 can be similarly linked with shaft 73 or 74, by actuation of either of two clutches 63 and 64, for rotation in one or the other direction. The pair of alternatively operable clutches 61 and 62 comprises two annular hydraulic cylinders concentrically surrounding two similar cylinders of the pair of alternatively operable clutches 63 and 64, respectively; thus, no additional axial space is required to accommodate this latter pair.

Shaft 71 works into a conventional gear shifter 92 driving the innermost shaft 70 at the same or reduced speed. The opposite ends of shaft 70 constitute driving inputs of a pair of differential gearings 94, 96 which also have steering inputs in the form of tubular shafts 93, 95 surrounding respective output shafts 97, 99. Shafts 97 and 99 are connected through a pair of stepdown transmissions 98 and 100 with driven shafts 123 and 124, respectively. Thus, the two tracks 121 and 122 are codirectionally driven by the main shaft 57, with a variable speed ratio determined by gear shifter 92, for forward or backward travel according to which of the two clutches 61, 62 is actuated. The speeds of these tracks will be identical as long as no supplemental torque is transmitted to their steering inputs 93 and 95.

Shaft 72 carries a spur gear 81 meshing with another such gear 82 on a shaft 83 which can be immobilized by a brake 86, these gears forming part of a steering unit 80 also including a spur gear 84 on shaft 83 in mesh with another such gear 85 on a shaft 87. Shaft 87 carries a pinion 88 engaging a gear 89 which is rigid with a ring gear 46 of a planetary-gear set 45 also including a sun gear 47 and a number of planet gears 48 on a carrier 50. Unit 45 forms the second of two cascaded planetary-gear stages, the first stage 36 comprising a ring gear 38 on a tubular shaft 35, a sun gear 37 on a tubular shaft 44 and a number of planet gears 39 on a carrier 40 rigid with a tubular shaft 49. Shafts 35 and 44 surround a further tubular shaft 34 traversed by a stationary shaft 43. A coupling sleeve 42 is selectively operable, by a leftward shift from its illustrated neutral position, to interlink the shafts 34 and 44 or, by a rightward shift, to immobilize the shaft 49 by consolidating it with shaft 43. Shaft 34 carries the last gear 27c of a train of spur gears 27 whose first gear 27a is mounted on the output shaft 26 of a hydrostatic motor 25 and is coupled with gear 27c through an intermediate gear 27b keyed to a tubular shaft 28 coaxial with shaft 87. A collar 65 permits a gear 67, keyed to shaft 28, to be shifted into mesh with a gear 66 on shaft 74.

Hydrostatic motor 25 is fluidically linked with an adjustable pump 16 driven from engine shaft 8 via a pair of spur gears 9, 10, a coupling 12 comprising two meshing bevel gears 12a, 12b, a spur gear 14 on the shaft 13 of gear 12b, and another spur gear 15 on pump shaft 17. Another adjustable pump 20 has a shaft 21 carrying a spur gear 19 driven from gear 15 through a further spur gear 18; thus, the two pumps 16 and 20 operate in unison. Pump 20 feeds another hydrostatic motor 30 whose shaft 31 carries a gear 32 in mesh with a gear 33 on shaft 35 which constitutes one of the inputs of first-stage planetary-gear set 36; thus, the two inputs 44, 35 of unit 36 are respectively driven by motors 25 and 30 with counterrotation of its sun gear 37 and ring gear 38 so that planet carrier 40 does not turn when these two motors operate at the same speed. In that event the input 49 of second-stage unit 45 is also stationary and, with brake 86 operated to immobilize the other input 87 thereof, planetary-gear assembly 36, 45 imparts no rotation to an output gear 51 rigid with its planet carrier 50. With a variation of the relative delivery rates of pumps 16 and 20 through suitable steering means not further illustrated, gear 51 is turned in one or the other direction according to the desired sense of veering. Instead of using two adjustable pumps, I may make hydrostatic motors 25, 30 adjustable and supply them from a common pump as also known per se from the above-mentioned German Patent No. 1,929,380.

Through a gear train 125 not illustrated in detail, output gear 51 drives a gear 52 rigid with input shaft 95 of differential gearing 96; the same torque is transmitted via a further gear train 126, meshing spur gears 112 and 111, a control shaft 110, and meshing gears 113, 114, 115 to a gear 129 on input shaft 93 of differential gearing 94, with an inverted sense of rotation relative to that of shaft 95, whereby opposite torques are superposed upon the codirectional driving torques applied to shafts 123 and 124 so that tracks 121 and 122 move at different speeds for a turn to the right or to the left. Differential gearings 94 and 96 could be of the usual symmetrical construction or could be constituted by planetary-gear trains similar to those shown at 36 and 45.

With the system so far described, therefore, the moving vehicle can be steered in a road-hugging manner with the aid of the continuously adjustable pumps 16 and 20. Since the pumps are powered directly by engine 1, their delivery rates may be insufficient to negotiate sharp curves during downhill driving when the engine speed is relatively low, with turbine 4 of torque converter 2 outrunning its impeller 3. In such a situation the operator may release the brake 86 and actuate one of the clutches 63, 64 to deliver a supplemental steering torque via shaft 87 to the second input of planetary-gear train 45, causing its ring gear 46 to turn in the same sense as its sun gear 47 so as to accelerate the rotation of its planet carrier 50. This supplemental torque is derived from the main shaft 57 and is therefore proportional to the speed of the vehicle rather than to that of the engine. Such a converter-dependent steering force is also available for turning the vehicle on the spot by counterrotation of its endless tracks 121, 122 with clutches 61 and 62 unoperated.

An adjustable ancillary oil pump 127, driven by a nonillustrated external power source such as a small internal-combustion engine otherwise used to drive a current generator, may be utilized to operate the vehicle in the event of failure of the main engine or whenever the latter must not be used (e.g. to avoid noise). The input of motor 25 can be switched, via a schematically indicated valve 128, to the output of pump 128. The output shaft 26 of motor 25 may then be linked with the mechanical power train 56 through a shifting of gear 67 into engagement with gear 66 by means of collar 65, so that main shaft 57 is now driven from motor 25 via gears 27a, 27b, 67, 66, 60 and 58 while the stator of converter 2 freewheels via unidirectional coupling 6. By shifting the sleeve 42 to the right, concurrently with the leftward displacement of gear 67, the operator blocks the shaft 49 so that actuation of clutch 63 or 64 is effective to steer the vehicle through the intermediary of shaft 72 and gears 81, 82, 84, 85 and 88. Clutches 61 and 62 can again be selectively actuated to drive the vehicle forward or backward. With shaft 44 decoupled from shaft 34, motor 30 would be ineffectual if it were fed from pump 20 which, however, is placed in neutral (along with pump 16) during this mode of operation. Through the intermediary of a further planetary-gear train or equivalent summing unit, not shown, it would also be possible to let motor 30 contribute to the driving of the mechanical power train 56 if it were concurrently fed from an ancillary pump.

I claim:
1. A vehicular steering system comprising:
a pair of driven shafts coupled with respective traction elements on opposite sides of a vehicle body;
a hydraulic torque converter with an input side and an output side;
an engine coupled to said input side;
reversible transmission means linking said output side with said driven shafts, said transmission means having two branches including respective differential-gear sets each having a driving input and a steering input;

a continuously adjustable hydraulic power train coupled with said input side;

a supplemental mechanical power train coupled with said output side;

additive gear means provided with a first input shaft drivable from said engine via said hydraulic power train, a second input shaft drivable from said torque converter via said mechanical power train, and an output shaft; and link means forming two relatively reversed driving connections from said output shaft to said steering inputs for translating any rotation of said output shaft into mutually opposite torque components applied to said driven shafts;

said transmission means further including a main shaft powered by said torque converter and a first pair of clutches for alternately connecting said main shaft with both driving inputs to reverse the sense of rotation of said driven shafts;

said mechanical power train including a second pair of clutches for alternately connecting said main shaft with said second input shaft for rotating said output shaft in either of two directions;

said additive gear means including a first and a second planetary-gear set in cascade with each other, each of said planetary-gear sets having two inputs, said hydraulic power train including pump means drivable by said engine and a pair of hydrostatic motors fluidically linked with said pump means, said motors being connected with respective inputs of said first planetary-gear set, said mechanical power train being connected with one input of said second planetary-gear set, the other input of said second planetary-gear set being connected with the output of said first planetary-gear set.

2. A system as defined in claim 1 wherein said first pair of clutches comprises a first pair of cylinders and said second pair of clutches comprises a second pair of cylinders respectively concentric with said first pair of cylinders.

3. A system as defined in claim 1 wherein said mechanical power train includes brake means for selectively immobilizing said one input.

4. A system as defined in claim 1, further comprising changeover means for decoupling at least one of said motors from said first planetary-gear train and immobilizing the other input of said second planetary-gear train.

5. A system as defined in claim 4, further comprising coupling means operable to establish a driving connection from said one of said motors to said main shaft.

6. A system defined in claim 5, further comprising an ancillary pump for operating said one of said motors.

7. A system as defined in claim 1, further comprising adjustable speed-reducing means in said transmission means and bypass means for said torque converter operable to connect said main shaft directly with said engine.

8. A system as defined in claim 1 wherein said traction elements are endless tracks.

* * * * *